Dec. 18, 1956     R. N. HIPP     2,774,155
COMBINED SCRAPER, BULLDOZER AND SCARIFIER
Filed Sept. 8, 1953
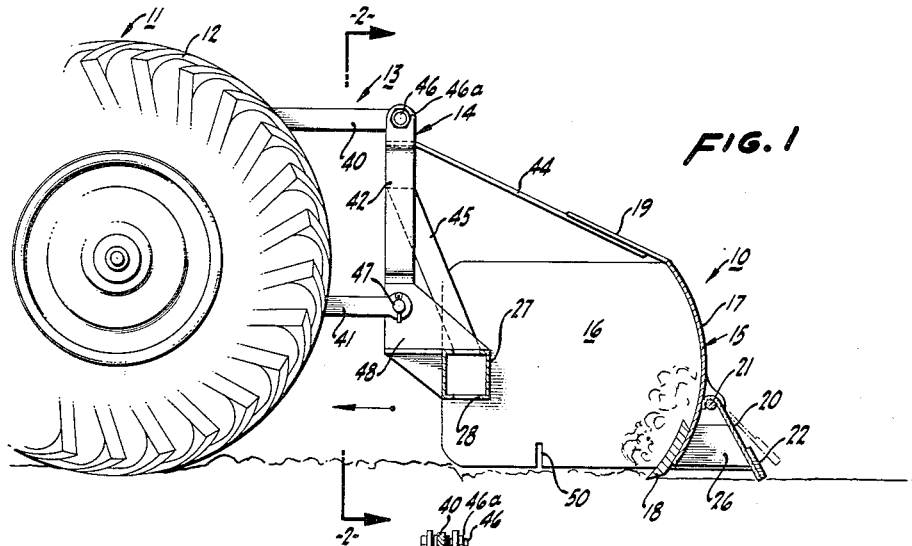
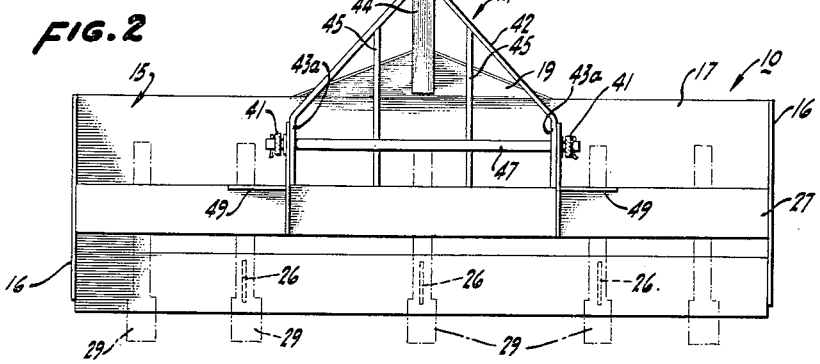
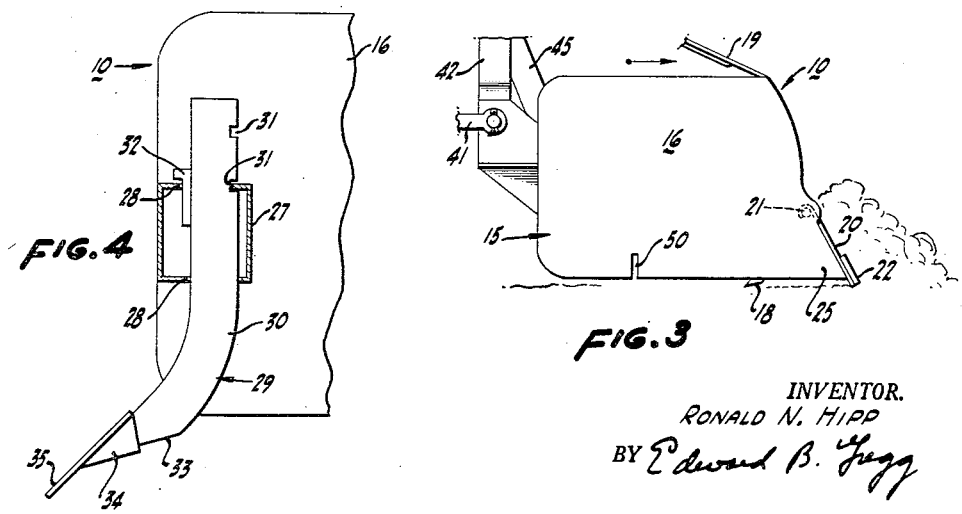
INVENTOR.
RONALD N. HIPP
BY Edward B. Fugg
ATTORNEY

United States Patent Office 2,774,155
Patented Dec. 18, 1956

2,774,155

COMBINED SCRAPER, BULLDOZER, AND SCARIFIER

Ronald N. Hipp, Menlo Park, Calif., assignor to Bob Hipp Welding Works, Palo Alto, Calif., a copartnership Application September 8, 1953, Serial No. 379,037

1 Claim. (Cl. 37—145)

This invention relates to an attachment for tractors to serve as a combined scraper and bulldozer, or leveler, and preferably also as a scarifier or digging device.

In many types of construction work it is desirable to provide an attachment capable of being pushed and pulled by a tractor, which is capable of doing several jobs, such as scraping, bulldozing, scarifying, and digging.

For such purposes it is desirable that the attachment be not too bulky, be relatively inexpensive to manufacture, and be simple to attach and operate. It is also desirable that it be rugged in its construction and efficient in doing the several jobs for which it is designed. Also, it is important in a multiple use apparatus of this character, that it be so constructed and reinforced that the great variety of stresses and strains placed upon it do not cause damage or breakdown.

It is an object of the present invention to provide an improved multiple purpose device of the character described.

Another object of the invention is to provide a multiple purpose attachment to be operated by conventional tractors, such as the well-known Ferguson tractor, to accomplish scraping, bulldozing and scarifying functions.

These and other objects of the invention will be apparent from the ensuing description and the appended claim.

One form of the invention is illustrated by way of example in the accompanying drawing in which:

Figure 1 is a view in midsection through the combined scraper, bulldozer, and scarifier device of the present invention.

Figure 2 is a view in front elevation thereof as seen along the line 2—2 of Figure 1.

Figure 3 is a view in side elevation of the device of Figure 1.

Figure 4 is a fragmentary view, partly in section and partly in side elevation, showing the means by which the scarifier member is attached to the apparatus of Figure 1.

Referring now to the drawings, and more particularly to Figures 1 and 2, the apparatus is generally designated by the reference numeral 10, and it is shown as being attached to a tractor 11, one wheel of which is shown at 12. The tractor is shown as being provided with an automatic self-leveling connection generally designated as 13. This type of connection, which is described in somewhat more detail hereinafter, is of known design and construction and is a standard part of the well-known Ferguson tractor. It has as its object to automatically level a plow or other device pulled by the tractor. The wheels 12 of the tractor act as a gauging element and the automatic leveling connection 13 serves to communicate the up and down motion of the wheels to the attachment to cause the same to move in unison with the wheels of the tractor.

The apparatus 10 of the invention is provided with an A frame 14, which is described in detail hereinafter, for attachment to the automatic leveling connection 13 of the tractor.

The apparatus 10 comprises what may be termed a bucket, which is designated generally by the reference numeral 15. The bucket 15 comprises side walls 16 and a rear wall 17 which has a curvature as shown and is convex outwardly. To the lower edge of the rear wall 17 is attached a hardened steel scraper blade 18, which may be attached to the rear wall by welding, by bolts or any other suitable means. Extending forwardly and upwardly from a curved rear wall 17 is a triangular plate 19 which is integral with the rear wall 17 and which serves an important function described in detail hereinafter.

A back filling blade 20 is also provided, which is pivoted at 21 on extensions of the side walls 16. At its lower edge the back filling blade 20 is provided with a wear plate 22. Stop members are provided in the form of extensions 25 of the side walls 16 and webs 26 which are welded to the rear wall 17.

In use, as will be apparent from an inspection of Figures 1 and 3, as the apparatus 10 is pulled forwardly by the tractor 11, the scraper blade 18 will dig into the ground to a depth determined by the distance between the lower edges of the side walls 16 and the lower edge of the scraper blade 18. Meanwhile, the back filling blade 20 will merely ride over the surface of the ground and is free to pivot upwardly as indicated in broken lines in Figure 1. However, the function of the back filling blade 20 during this scraping action is not entirely passive, inasmuch as its weight resting on the ground has a desirable leveling action. On the other hand, when the apparatus is pushed rearwardly, as indicated in Figure 3, the back filling blade 20 is held against the stops 25 and 26 and it then serves as a bulldozer or leveling element to pile up dirt ahead of it, as illustrated.

Referring now more particularly to Figure 4, a relatively massive bar or beam 27 is provided in which slots 28 are formed to receive scarifier members 29. The bar 27 is an important part of the design and structure of the apparatus 10. It serves as a support for scarifier members 29 as indicated; it also serves as a principal reinforcement member of the apparatus; it is a weighting member to hold the apparatus in firm contact with the ground; and it also serves as the main support of the A frame 14.

It will be seen that each of the scarifier members 29 is formed of a steel bar 30 which is formed with notches 31 to engage the bar 27, as shown. Two such notches are shown, although more or less may be provided, thus providing a means of adjusting the height of the scarifier member and the depth of cut it makes. A wedge member 32 is provided to wedge and hold the scarifier member 29 in its selected position. At its lower end, the scarifier bar 30 is tapered, as shown at 33, to receive the boot 34 of a scarifier tooth 35. The scarifier tooth 35 and its boot 34 may be of standard construction, the tooth 35 being of hardened steel construction.

Referring now more particularly to Figures 1 and 2, the aforesaid automatic leveling connection 13 comprises a single top bar 40 and a pair of bottom bars 41, which are arranged in parallelism and at the corners of a triangle. The A frame 14 comprises a pair of bars 42, each of which is bent to vertical position at its upper end at 43 and at its lower end at 43a. A reinforcement bar 44 is welded to the upper ends of the bars 42 and also to the plate 19, thus providing additional reinforcement for the A frame 14. Further reinforcement is provided by a pair of bars 45 which are arranged in parallelism, and each of which is welded at its upper end to one of the bars 42, and at its lower end to the bar 27.

The top bar 40 of the automatic leveling connection 13 is rotatably connected to a pin 46 which extends through the upper, vertical end 43 of the A frame 14 and is suitably retained in place, as by means of a nut 46a. A rod 47 extends through the lower vertical ends 43a of the A frame, and the lower bars 41 of the automatic leveling connection 13 are rotatably mounted on the outer ends of the rod 47. Additional reinforcement is provided in the form of gussets 48 and 49, as illustrated.

It will thus be apparent that a multiple purpose attachment for tractors has been provided, which is operable to accomplish any one of several operations with efficiency. The apparatus is operable, for example, to carry out a scraping function during which the leveling or bulldozing element is inactive, or is operable to accomplish simultaneously a desirable leveling function. The apparatus is also operable, upon movement in the reverse direction, to carry out a leveling or bulldozing function. Also, the device is operable as a scarifier and digger. As indicated, any desired number of scarifier members or teeth may be mounted on the device. If only two or three of such members are employed and are located close together, the apparatus can be used to dig a small ditch. On the other hand, if the full complement of scarifier members are mounted, a scarifying or plowing function can be carried out. When not in use, the scarifier members can be inserted upside down in the slots 28.

The apparatus is so designed and reinforced that it will carry out all of these functions with efficiency and with little likelihood of damage or breakdown. The A frame 14 adapts the apparatus for utilization of an automatic leveling connection, such as that employed by the well-known Ferguson tractor. The integral construction of the rear wall 17 and the triangular plate or bracket 19 is advantageous in that it reduces manufacturing cost and provides greater strength than a bolted construction. The bracket 19 and bar 44 serve to brace the A frame 14 and to transmit motion of the tractor connection or coupling 13 to the rear of the bucket 15. The massive bar 27 serves the multiple function of a mounting for the scarifier members, a main reinforcement member for the bucket, a weighting member and a mounting for the A frame.

Among other advantageous features of the apparatus, mention may be made of the following: A leveling bar (not shown) may be fixed to the bucket 15, extending from side to side beneath the side walls 16. Slots 50 are provided to facilitate attachment of such leveling bar. The smooth, broad side walls 16 enable the apparatus to cut against a straight bank. With scarifier teeth mounted as shown in Figures 2 and 4, the apparatus digs or rips the scrapes simultaneously. The curvature of the scraper blade 18 and rear wall 17 allows the loosened earth to roll, hence gives the scraper blade greater "suction." The apparatus can make graduated cuts by locating the scarifier teeth first in a shallow position, then in a deep position. This permits ripping and digging to a considerable depth in difficult soil, such as clay, without the necessity of using a high horsepower tractor.

I claim:

A combination scraper, bulldozer and scarifier comprising a bucket having spaced, parallel side walls, an open top and front and a curved, outwardly convex rear wall; a scraper blade attached to said rear wall and extending below the lower edges of the rear and side walls; a bulldozer assembly comprising rearward extensions of said side walls and at least one intermediate stop member extending rearwardly from said rear wall, and a bulldozer blade pivoted to said extensions, said extensions and intermediate stop member serving as abutments to limit forward pivoting of the bulldozer blade; a massive cross beam fixed to and extending between said side walls at their forward ends, said beam being formed with slots to receive scarifier teeth; an A-shaped frame mounted on said cross beam and adapted to couple the device to the self-leveling coupling of a tractor; and reinforcement and connecting means connecting the upper end of said A frame to the rear wall of the bucket, said connecting means including a forward and upward extension of said rear wall.

References Cited in the file of this patent
UNITED STATES PATENTS

| | | |
|---|---|---|
| 1,786,323 | Welsh | Dec. 23, 1930 |
| 1,856,148 | Ball | May 3, 1932 |
| 2,428,857 | Smith | Oct. 14, 1947 |
| 2,433,019 | Arps | Dec. 23, 1947 |
| 2,566,562 | Hale | Sept. 4, 1951 |
| 2,578,131 | Gannon | Dec. 11, 1951 |
| 2,698,492 | Justice | Jan. 4, 1955 |